Jan. 3, 1967　　　E. V. HAAKE ETAL　　　3,296,083
FORCED CIRCULATION BOILING NUCLEAR POWER REACTOR
Filed Sept. 14, 1964　　　　　　　　　　　　5 Sheets-Sheet 1

Inventors
EUGENE V. HAAKE
JOHN M. KRASE

By Anderson, Luedeka, Fitch, Even & Tabin
Att'ys

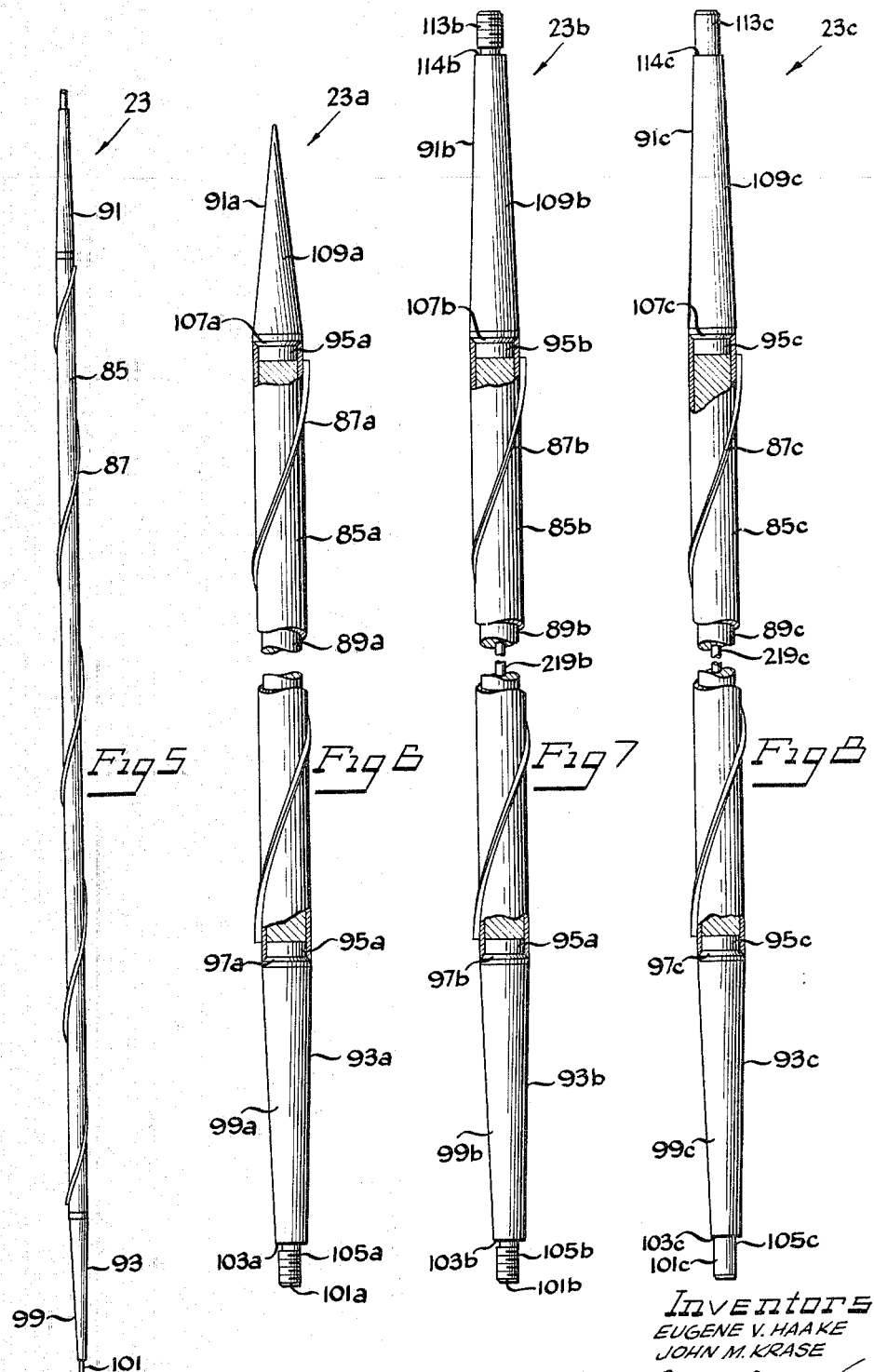

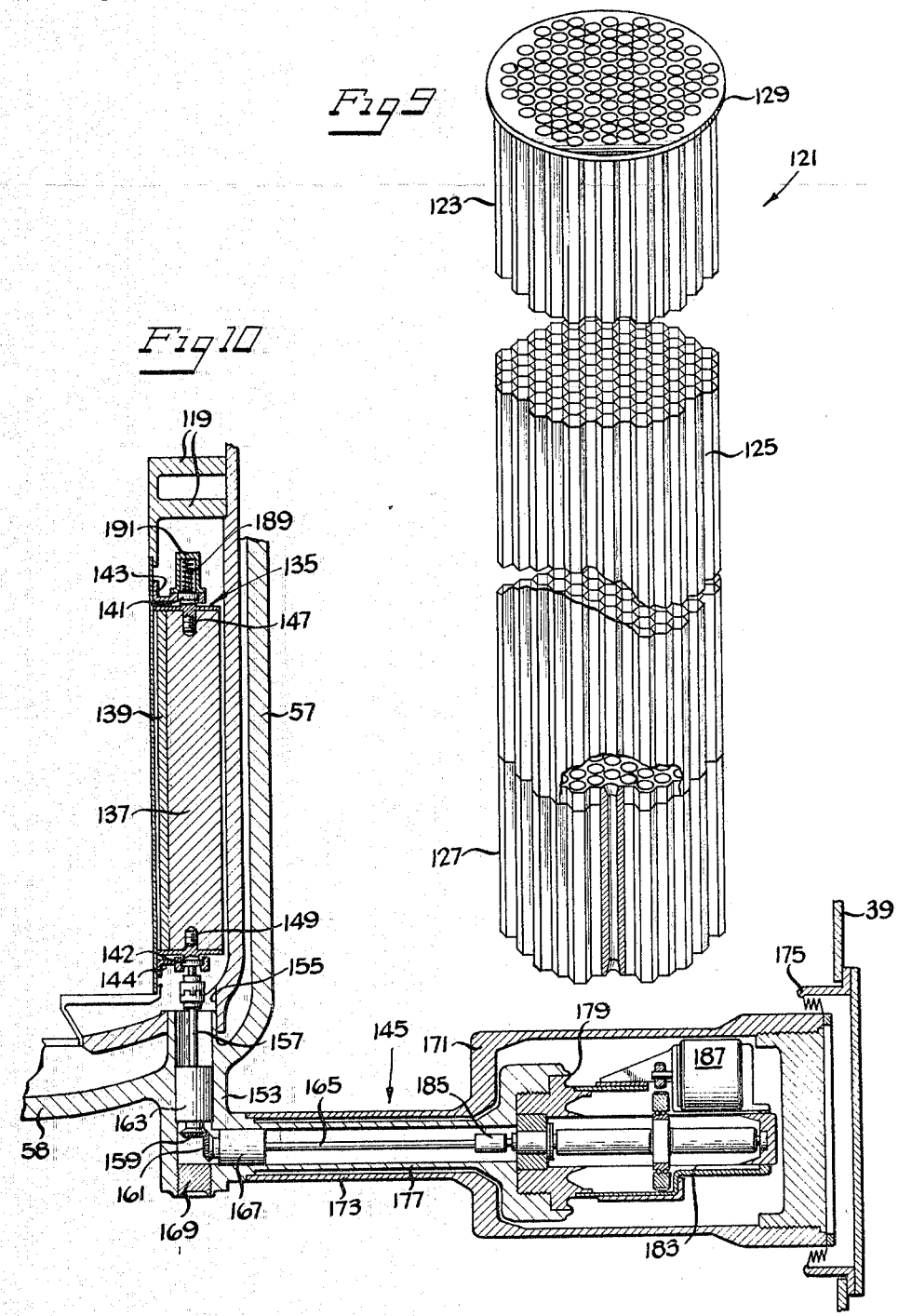

United States Patent Office 3,296,083
Patented Jan. 3, 1967

3,296,083
FORCED CIRCULATION BOILING NUCLEAR
POWER REACTOR
Eugene V. Haake, San Diego, and John M. Krase, La
Jolla, Calif., assignors to General Dynamics Corporation, New York, N.Y., a corporation of Delaware
Filed Sept. 14, 1964, Ser. No. 396,230
9 Claims. (Cl. 176—54)

This invention relates to nuclear reactors and more particularly to boiling water nuclear reactors which are designed for the production of power.

In general, a nuclear reactor includes a reactor core that contains fissionable nuclear fuel material, a moderating substance for slowing down high-velocity neutrons, and control elements for precisely regulating the neutron population of the reactor core. A reflector surrounds the core for the purpose of returning escaping neutrons thereto, and coolant is circulated through the reactor core to remove heat therefrom. Suitable radiation shielding surrounds the core and the reflector.

To compensate for fuel burn-up and cumulative fission product poisoning which normally occurs during the life of the reactor core, a reactor is initially provided with sufficient available excess reactivity in its core above that needed to produce a critical assembly. This excess reactivity is gradually used up over the life span of the reactor core. Insertion of this excess reactivity is normally controlled by manipulation of control rods. If all of the available excess reactivity is inserted into a reactor at one time, an accident might well result which would damage the reactor and endanger nearby personnel.

In the past few years, an inherently safe reactor has been developed for research in various fields of basic nuclear research and education. This reactor, which is a light water cooled and reflected pool-type reactor utilizing fuel-moderator elements of uranium-zirconium hydride alloy (U-ZrH), is known generally as the "Triga" reactor. A reactor is said to possess operational safety if its controls can be mishandled without danger of a nuclear accident. To be inherently safe, such a reactor must be designed so that all the available excess reactivity can be instantaneously inserted into the reactor without causing an accident. A reactor which meets this definition is capable of responding correctively to a power surge within a few milliseconds from the time that such a surge begins.

One important criterion for an inherently safe reactor is that an increase in the fuel temperature within the reactor core promptly and automatically results in reduced reactivity therewithin. A reactor having this characteristic is said to have a large, prompt, negative temperature coefficient of reactivity. Other criteria include limited excess reactivity and operation of the fuel elements well below metallurgical temperature limits.

To provide this large, prompt negative coefficient of reactivity, the Triga reactor incorporates fuel elements which are disposed in spaced relation in a water bath in the reactor core. Each fuel element includes a solid homogeneous mixture of enriched uranium and zirconium hydride, and also contains a burnable poison. When these fuel elements are heated by a surge in reactor power, several mechanisms contribute to the large-prompt, negative, temperature coefficient of the reactor.

The four major mechanisms are: (1) The fuel elements heat up and expand, as does the water, expelling part of the water from the core. This occurs in a time comparable to the dimensions of the reactor core divided by the sound velocity in water following the burst of heat, i.e., in fractions of a millisecond; this effect, termed the "fuel element expansion effect," is considered prompt. (The time delay of one neutron generation time between a neutron burst and the corresponding heat burst is ignored.) (2) Because the $U^{238}$ is distributed homogeneously throughout the fuel mixture, there is little self-shielding to reduce the effects of the sharp, low-energy resonances in $U^{238}$, which are most susceptible to Doppler broadening. Accordingly, resonance capture can be made relatively large, and the negative temperature coefficient due to broadening of the resonances is correspondingly increased. This generally referred to as the "neutron Doppler effect." (3) As the temperature of the ZrH and the water increases, the neutrons, as a result of their collisions with hydrogen atoms, no longer moderate to as low a velocity as they did before the surge. The result of this "warm-neutron effect" is that the average thermal-neutron velocity increases. Fewer neutrons are absorbed in the fuel, because the uranium cross section decreases with increasing neutron velocity, and more neutrons leak into the water where they are absorbed without causing fission. This resultant effect is referred to as the "leakage effect." (4) The increase in the average thermal-neutron velocity also results in increasing parasitic capture of neutrons in the burnable poison, since the poison has a greater neutron capture cross-section in the velocity and energy range slightly above "thermal."

It is desirable to provide inherently safe reactors which are suitable for production of high levels of power. In such reactors, there are other factors to consider because the load or the demand for power upon a power reactor does not always remain constant but normally varies as different uses are being made of the power produced. For example, the particular need for electrical power which might be generated by such a reactor system may often vary.

To effect the desired change in power output of a reactor, control systems are provided in nuclear reactors. These control systems have usually taken the form of control rods which, by insertion into or withdrawal from the reactor core, effect changes in the reactivity and neutron population of the reactor core, and consequently in the amount of heat generated. Furthermore, by insertion of these control rods into the reactor core, the system is reduced to a sub-critical level, effecting shutdown of the reactor. Moreover, nuclear power reactors which do not require external adjustments by means of control systems to provide for normal changes in power output are desired.

An object of the invention is to provide an improved reactor that is particularly designed for power production. Another object of the present invention is the provision of a power reactor which has inherent load-following capability. A further object is the provision of a compact, boiling-water, power reactor which is inherently safe and which employs a relatively low amount of excess reactivity. A still further object is the provision of an inherently safe, reliable, and compact nuclear reactor which is simple in construction and which provides low cost power. An additional object is the provision of a compact nuclear power reactor which is capable of remote, mobile, or unattended operation.

These and other objects of the invention are more particularly set forth in the following detailed description and in the accompanying drawings wherein:

FIGURE 5 is an enlarged elevational view of a fuel element shown in the reactor illustrated in FIGURES 1–3;

FIGURES 6, 7 and 8 are elevational views, partly in section, showing different types of fuel elements employed in the reactor;

FIGURE 9 is a partially exploded view of a portion of the nuclear reactor shown in FIGURES 1–3; and FIGURE 10 is an enlarged fragmentary sectional view taken generally along 10—10 of FIGURE 3.

Figure 1:
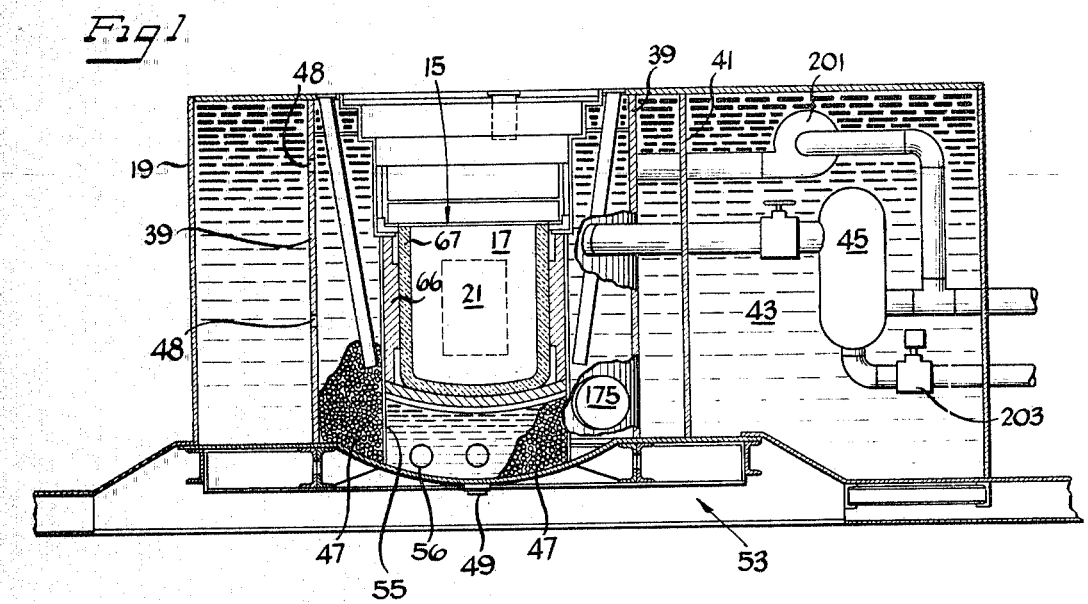
FIGURE 1 is a front elevational view, shown generally in section, illustrating a nuclear reactor system embodying various features of the invention.

It has been found that by means of a unique reactor core design it is possible to provide a boiling water nuclear power reactor which possesses a high degree of load-following capability. Inherent load-following in the case of a nuclear power reactor is defined as the capability of the reactor to respond automatically to a change in load or demand for power in such a manner that, without an external adjustment of reactivity, a new equilibrium condition is achieved within the reactor at the desired power level as a result of changes in other reactor system conditions that are acceptable from the standpoint of reactor operation.

Boiling-water reactors have a usual tendency to respond adversely to a change in load. However, it has been found that a boiling-water reactor utilizing $U-ZrH_x$ fuel elements may be provided which reactor is inherently safe in operation and which also has a high degree of load-following capability.

In general, a nuclear reactor 15 is shown in the drawings which is designed so that it may be transported from place to place. The reactor includes a pressure vessel 17 which is supported within a steel shield tank 19. The reactor 15 contains a reactor core assembly 21 which is disposed within the pressure vessel 17 and which includes a plurality of vertically extending, elongated fuel elements 23. An annular reflector 25 surrounds the core and is disposed in the region between the core 21 and the pressure vessel 17.

A flow-divider 27, which defines the outer boundary of the core 21, is disposed within the reflector 25 and directs fluid coolant, which is used to cool the core, past the reflector 25 before it enters the core. A fuel-free region 29 is disposed spacially within the outer boundary of the reactor core 21. In the illustrated embodiment, the fuel-free region 29 is in the form of a central, generally cylindrical hole.

Outside the annular reflector 25, there is disposed a generally cup-shaped thermal shield 33 which is spaced inwardly from the inner wall of the pressure vessel 17 thereby providing a toroidal-shaped coolant passageway 35 therebetween. The flow pattern of coolant within the pressure vessel 17 is arranged so that coolant enters the region between the thermal shield 33 and the flow-divider, flows downward to the bottom of the core 21, upward through the core into a chamber 37 atop the core, downward from the chamber 37 through the fuel-free region 29, outward into the toroidal passageway 35 between the thermal shield and pressure vessel, and finally out of the upper portion of the pressure vessel 17.

Ordinary water is employed both as a coolant and as a moderator. The operating temperature and pressure range of the reactor is adjusted so the water is at boiling conditions. Water is pumped into the pressure vessel 17 under sufficient pressure so that there is forced circulation throughout the reactor 15.

More specifically, the shield tank 19, shown in FIGURE 1, is elongated in shape having a generally rectangular horizontal cross section. Within the tank 19 is disposed an inner tank 39 of generally cylindrical shape. The shield tank 19 includes an intermediate vertical wall 41 that divides one end of the tank 19 into a separate compartment 43 in which a steam-separator 45 and other ancillary equipment are located.

The inner tank 39 is filled with lead balls 47 to provide shielding from gamma radiation emanating from the reactor. The shield tank 19 is filled with a liquid, such as ordinary water, which serves both as a radiation shield and as a coolant. The inner tank 39 is also filled with water, and screened holes 48 are provided for passage of liquid through the walls of the inner tank 39. Thus, the lead balls 47 are cooled by the natural circulation of water within the tanks. To permit the lead balls 47 to be easily unloaded, an unloading valve 49 is provided at the bottom of the inner tank.

The inner tank 39 is suitably supported upon a heavy beam structure 53 at the bottom of the shield tank 19. The pressure vessel 17 of the reactor is supported within the inner tank 39 by means of a pressure vessel support cylinder 55 into which the upper portion of the pressure vessel interfits. This support cylinder 55 is seated upon the bottom of the inner tank 39. The bottom of the pressure vessel 17 is hereby spaced above the bottom of the inner tank 39. The support cylinder 55 has openings in its bottom so lead balls may be disposed under the pressure vessel 17 and free circulation of shield water is permitted therethrough.

Figure 2:
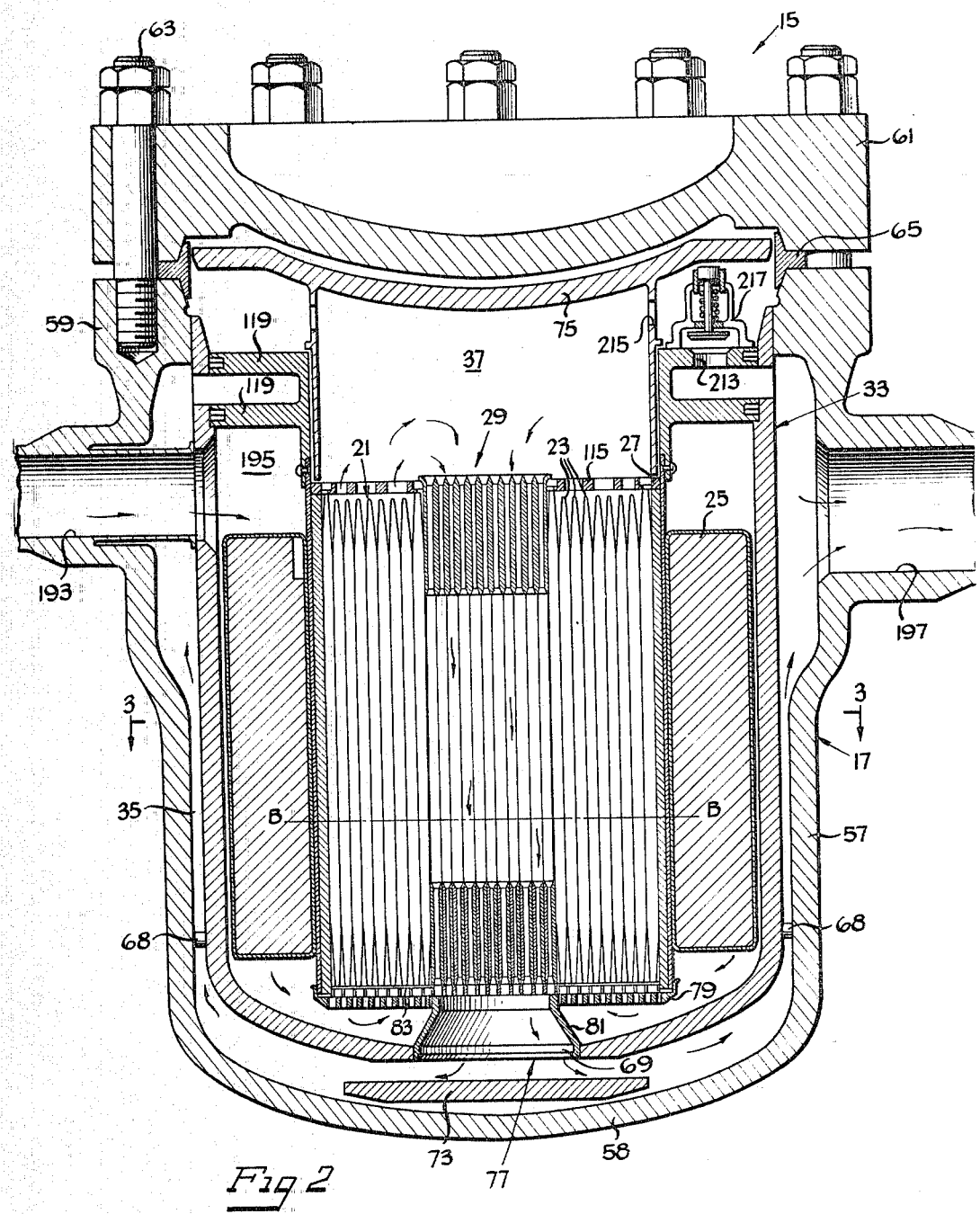
FIGURE 2 is an enlarged sectional view taken along line 2—2 of FIGURE 3.

As best seen in FIGURE 2, the pressure vessel 17 includes a generally tubular side wall 57 and an elliptical bottom head 58 integrally formed with the side wall 57. The pressure vessel 17 is made of a material, such as stainless steel, which has good resistance to high energy neutron embrittlement. The upper portion of the side wall 57 terminates in an upper circular rim 59 of increased thickness to which there is attached a top head or cover 61 that is removably fastened by bolts 63 which extend downward through the cover 61 and into tapped holes in the rim 59. A suitable gasket 65 is provided between the top cover 61 and the rim 59 to provide a liquid-tight joint therebetween.

To minimize stresses, the pressure vessel 17 and the top head 61 may be insulated by a water-tight jacket 66 (FIG. 1) which encompasses the entire pressure vessel. Thermal insulating material 67, such as glass wool, is disposed within the jacket 66 about the outer surface of the pressure vessel 17. Fusable plugs (not shown) are provided at appropriate locations in the jacket 66 which will melt under emergency loss-of-cooling conditions, permitting shield water to directly cool the outside of the pressure vessel 17.

The thermal shield 33 which generally approximates the pressure vessel 17 in shape but which is proportionately smaller than it, is appropriately supported concentrically within the pressure vessel, as by welding at appropriate places and using spacers 68. The space between the inner wall of the pressure vessel 17 and the outer wall of the thermal shield 33 constitutes the toroidal coolant exit passageway 35. A circular opening 69 in the bottom of the thermal shield 33 provides an entrance into this passageway 35. A circular opening 69 in the bottom of the thermal shield 33 provides an entrance into this passageway from the bottom of the reactor core 21. A circular plate 73 suitably secured to the elliptical bottom head 58 closes the gap in the thermal shield 33 left by the circular opening 69. The thermal shield 33 is completed by an upper plate 75 which conforms to the shape of the pressure vessel cover 61 and is suitably supported atop the flow divider 27.

As best seen in FIGURE 2, the reactor core assembly 21 is supported centrally within the pressure vessel 17 by a core support assembly 77. The core support assembly 77 includes a horizontally disposed annular support plate 79 made of a suitable material, such as stainless steel. The annular plate 79 is supported in spaced relation above the bottom of the thermal shield 33 by a tubular support section 81 secured to the thermal shield, as by welding, at the circular opening 69 therein. A bottom grid plate 83 is suitably secured upon the upper surface of the annular support plate 79. Both the bottom grid plate 83 and the annular support plate 79 are perforated to permit ample flow of coolant vertically therethrough.

Figure 3:
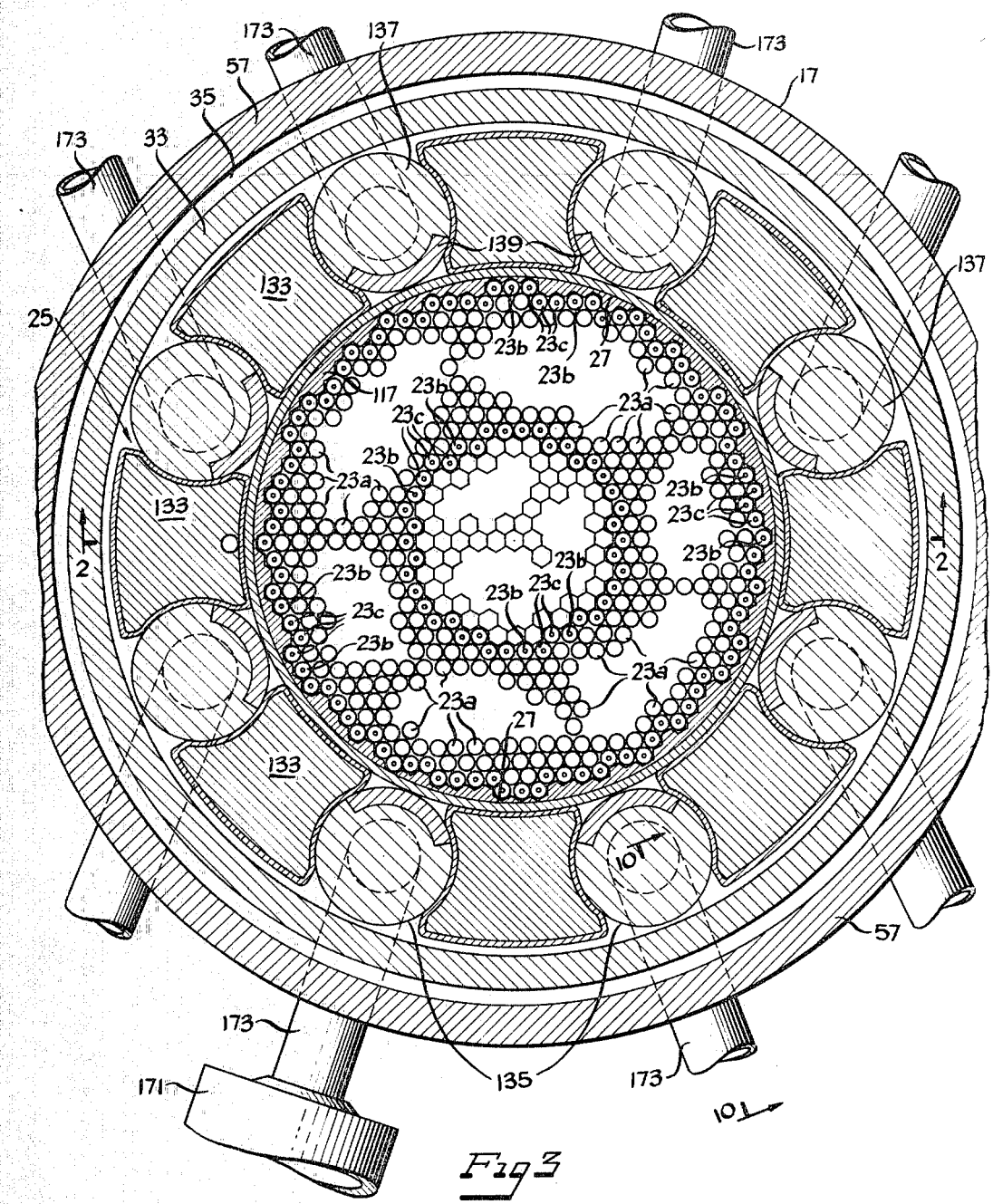
FIGURE 3 is an enlarged horizontal sectional view taken along line 3—3 of FIGURE 2.

As best seen in FIGURES 2 and 3, the reactor core assembly 21 includes a plurality of the elongated, vertically extending fuel elements 23, each of which rests on the bottom grid plate 83. There are three slightly different types of fuel elements (FIGS. 5–8) disposed within the reactor core. Fuel elements 23a are in the majority and constitute the center portion of the annular active core region. Fuel elements 23b and 23c line both the inner and the outer perimeters of the annular active reactor core region.

As best seen in FIGURE 5, each of the fuel elements 23 includes a generally elongated intermediate tube 85 made of a material, such as stainless steel, which withstands high temperatures and which has good resistance to high energy neutron embrittlement. Each fuel element tube 85 has a spiral rib 87 about its outer surface which serves both to laterally space it from adjustment fuel elements in the reactor core and which also serves as a coolant guide vane that causes the fluid coolant to swirl as it flows axially past. The swirling of the coolant increases the total heat transfer between the fuel elements 23 and the coolant stream.

Each fuel element tube 85 is filled with nuclear fuel material 89, which will be hereinafter described in detail, and is closed at its ends by a top end fixture 91 and a bottom end fixture 93, made of suitable material, such as stainless steel, which are suitably joined to the tube 85, as by welding. Small void spaces 95 are provided in each fuel element at each end of the tubes 85 wherein gaseous fission products from the nuclear fuel material 89 may accumulate.

The illustrated end fixtures 91 and 93 have several different shapes. The particular end fixtures with which a fuel element 23 is provided depends upon the structural function of the fuel element within the reactor core 21. For purposes of the following description, the particular parts of each of the three types of fuel elements 23 are indicated with the same letter subscript. Also, similar parts of the three different types of fuel elements 23 are indicated with the same reference numerals, together with the letter subscript of the particular fuel element of which it is a part.

Each fuel element 23a includes a top end fixture 91a and a bottom end fixture 93a. The bottom end fixture includes an upper portion 97a of reduced diameter, which is suitably received within the bottom end of the intermediate tube 85a, a central elongated, downwardly tapering portion 99a, and a lower supporting pin 101a. The pin 101a is reduced in diameter to provide a shoulder 103a upon which the weight of the fuel element 23a is supported. The lower pin 101a of each of the fuel elements 23a passes through a suitably proportioned aperture in the bottom grid plate 83 to properly position the fuel elements 23a in the reactor core. Threads on the pins 101a allow the fuel elements 23a to be secured in place by nuts.

A flat surface 105 is milled at a particular location on the lateral surface of each of the pins 101. A corresponding flat is provided in each of the apertures in the bottom grid plate 83. Thus, when the fuel elements 23 are loaded into the reactor core 21 so that the flat surfaces of the pins 101 and apertures coincide, each of the fuel elements is aligned with its spiral rib 87 disposed in the desired relative position.

The top end fixture 91a of each of the fuel elements 23a includes a lower portion 107a of reduced diameter, which is suitably received within and joined to the upper end of the tube 85a, and an upwardly tapering portion 109a. Thus, the top ends of the fuel elements 23a are unrestrained when loaded in the reactor core. Lateral support for the fuel elements 23a is through contact with adjacent fuel elements seriatum to the anchored fuel elements 23b and 23c.

Fuel element 23b is shown in FIGURE 7. Each of these fuel elements has a bottom end fixture 93b exactly similar to those of fuel elements 23a, having threaded pins 101b which extend through like positioning apertures in the bottom grid plate 83 wherein they are secured by nuts. However, the fuel elements 23b are used to tie the bottom grid plate 83 to an upper grid plate 115 so the top end fixture 91b is accordingly provided with a threaded pin 113b. The top end fixture 91b also includes an upward tapering center portion 109b and a lower portion 107b of reduced diameter by which connection is made to the tube 85b.

In the loaded reactor core, the threaded pins 113b of the fuel elements 23b extend through suitable apertures in the upper grid plate 115 and are secured thereto by nuts which are seated in counterbores in the upper grid plate. In this position, the upper grid plate rests on shoulders 114b which are formed as a part of the upper end fixture 91b immediately below the threaded pins 113b.

Fuel elements 23b are spaced every fourth fuel element along the outer perimeter of the annular active core region, and alternately every third and fourth fuel element along the inner perimeter thereof. The perimeters of the core in the areas between the fuel elements 23b are completed by fuel elements 23c. Fuel elements 23b and 23c, although similar nuclearly as will be hereinafter explained, are slightly different mechanically. Fuel elements 23c are slightly shorter than fuel elements 23b so that they do not fit tightly between the grid plates 83 and 115. Moreover, although the lower pin 101c also has a flat surface for positioning purposes, neither the lower pin 101c nor the upper pin 113c is threaded. Thus, the fuel elements 23c merely interfit between the grid plates and are not secured thereto.

In general, in addition to having the above-mentioned positioning apertures, both the bottom grid plate 83 and the top grid plate 115 have suitable perforations between these apertures through which coolant may be easily circulated.

To fill the gap about the fuel elements 23 which constitute the outer periphery of the reactor core 21 and prevent inefficient flow of coolant therealong, a circumferential filler 117 is provided as a part of the flow divider 27. This circumferential filler 117 is preferably of the same material as the rest of the flow divider, i.e., zircaloy, and is appropriately secured thereto. The flow divider 27 extends upwardly from the lower annular support plate 79, defining the outer boundary of the reactor core 21. At its upper end, the flow divider 27 includes a pair of outwardly extending flanges 119 which are seated in an appropriate recess provided in the top of the thermal shield 33 to appropriately position the flow divider in the pressure vessel 17.

In the illustrated embodiment, the fuel-free region 29 is a cylindrical central water hole, but, as will be hereinafter explained, the fuel-free region may take other shapes. The central water hole is provided by a honeycomb structure 121 which occupies the center of the reactor core 21. The honeycomb structure 121 includes an upper reflector 123, an intermediate section 125, and a lower reflector 127. The intermediate section 125 is made from a plurality of thin-walled hexagonal tubes of a suitable material, such as zircaloy, suitably joined, as by brazing, into an integral rigid structure. The upper and lower reflectors 123, 127 are machined from blocks of suitable material having good reflecting properties, such as nickel or beryllium.

The upper and lower reflectors 123, 127 each have longitudinally extending holes aligned with each of the hexagonal tubes in the intermediate section 125 to complete parallel, elongated flow channels therethrough. The lower reflector 127 is preferably welded at its bottom to the core support plate 79 to secure it in the desired position.

The intermediate section 125 of the honeycomb structure 121 has the same outline as the lower reflector 127. The bottoms of the tubes in the interior of the intermediate section 125 are cut away at their lower ends for a short distance so that the intermediate section 125 fits over the top of the lower reflector 127 (FIG. 9). The lower reflector 127 is accordingly recessed along its upper periphery to accommodate the lower portion of the intermediate section 125. The intermediate section 125 and the lower reflector 127 are appropriately pinned together and then suitably sealed, as by brazing.

The upper reflector 123 is generally similar in configuration to the lower reflector, having the same outline. A recess is likewise provided about the lower end of the upper reflector 123 so that it can interfit downward into a mating cutaway region provided at the top of the intermediate section 125. No permanent connection is made between the upper reflector 123 and the intermediate section 125 of the honeycomb structure. In the illustrated embodiment, the upper reflector 123 is designed to be removed before the top grid plate 115 is removed whenever refueling is to be accomplished. Accordingly, the upper reflector 123 includes a top circular flange 129 which extends outward from the main body and rests upon the top grid plate 115.

The annular side reflector 25 includes a plurality of massive blocks 133 of a suitable material, such as beryllium, each of which is clad with a protective cladding of a suitable material, such as zircaloy. As best seen in FIGURE 3, these blocks 133 are suitably connected to the flow divider 27 so that inner arcuate surfaces of the blocks are contiguous with the outer surface of the flow divider. Interspaced between adjacent blocks 133 are reflector control drums 135. Each of these control drums comprises a cylinder 137 of a suitable neutron reflective material, such as beryllium, having a height somewhat greater than the tubes 85 of the fuel elements 23. The cylinders 137 are also clad with a suitable protective material, such as zircaloy.

So that the drums 135 may perform their intended control function, an annular segment of suitable size, as for example about 120°, is machined out of each of the beryllium cylinders 137 and is replaced by an annular segment 139 of a suitable poison material, such as borated stainless steel. To rotate the control drums so that the poison segments 139 may be positioned as desired relative to the reactor core 21, each of the drums 135 is mounted on upper and lower support bearings 141 and 142 attached by suitable brackets 143 and 144 to the flow divider 27.

In the illustrated reactor there are eight control drums 135 symmetrically located in the annular side reflector 25. Each of the eight control drums has a separate drive mechanism 145. Four control drive mechanisms 145 extend inward from the front of the reactor, as viewed in FIGURE 3. The four remaining control drive mechanisms 145 extend inward from the opposite side or rear of the reactor 15. All of the control drum drive mechanisms 145 are similar in construction so only one of them will be herein described.

As best seen in FIGURE 10, each of the reactor drums 135 includes an upper stub shaft 147 and a lower stub shaft 149 which are respectively located in the upper and lower ends of the drum. These shafts are rotatively supported in the bearings 141 and 142. At a location vertically below each of the control drums 135, a nozzle 153 is formed in the pressure-vessel bottom head 58 through which the drum drive mechanism 145 passes. The upper portion of the nozzle 153 extends upward through a suitable opening 155 provided in the thermal shield.

A shaft extension 157 which is suitably coupled to the lower stub shaft 149 is disposed within the nozzle 153. A horizontal passageway at right angles to the vertical passageway through the nozzle 153 connects with it at the lower end thereof. At this right-angle junction, a set of interengaging miter gears 159 and 161 are provided. The upper miter gear 159 is secured to the bottom of the vertical shaft extension 157 just below a rotatably supporting bearing cartridge 163 that is suitably secured within the vertical nozzle passageway. The mating miter gear 161 is attached to a horizontal drive shaft 165 that is similarly supported in a bearing cartridge 167 which is disposed within the connecting horizontal passageway.

The lower end of the vertical nozzle passageway is closed by a suitable plug 169 which is secured in place, as by welding. The horizontally extending portion of the nozzle 153 is closed by a control drive housing 171 that includes a horizontal extension tube portion 173, the end of which is secured, as by welding, to the nozzle 153. The opposite end of the control drive housing 171 is supported by a bellows-type mounting assembly 175 that is secured within a suitable circular aperture within the wall of the inner tank 39. Another seal for the pressure vessel is provided by welding an inner mounting sleeve 177 to the nozzle 153 concentrically within the horizontal extension tube 173 of the control drive housing 171. The mounting sleeve 177 is appropriately secured, as by welding, to a housing portion 179 of a harmonic drive unit 183. One end of the harmonic drive unit 183 is joined by a suitable coupling 185 to the end of the horizontal drive shaft 165. A suitable drive motor 187 is also mounted on the housing 179 of the harmonic drive unit 183 and is suitably connected to the other end thereof by a gear arrangement.

As a safety feature, a torsion spring 189 is mounted about the upper stub shaft 147 within a suitable cover 191 attached to the upper mounting bracket 143. One end of the torsion spring 189 is secured to the shaft 147 and the other end is secured to the cover 191. The arrangement is such that the torsion spring 189 biases the control drum 135 to its most effective or shutdown position, i.e., wherein the poison angular segment fully faces the reactor core (FIG. 3). A mechanical stop (not shown) is provided at the lower end of the control drum 135 to halt the rotation of the drum at this point. The torsion spring arrangement serves as a safety back-up in the unlikely event that a gear or one of the shafts in the drive mechanism 145 should fail.

A suitable electrical unit (not shown) is also connected to the harmonic drive unit 183 to provide readout of the position of the reflector control drum 135 on a reactor control console (not shown). The reactor control console contains suitable electrical circuitry to permit the simultaneous rotation of all the eight control drums 135 at once or to drive any single one of them separately. Automatic override circuitry (not shown) is also provided to drive the control drums 135 to their most effective positions and thereby effect positive shutdown of the reactor in the unlikely instance that any unsafe condition should develop within the nuclear reactor. Alternately, an electromagnetic clutch may be provided to couple the harmonic drive unit 183 to the drive shaft 165. The clutch could be de-energized if an unsafe condition occurs, letting the torsion spring 189 effect shutdown of the reactor 15.

In the illustrated reactor 15, ordinary water is the preferred coolant-moderator. Water is supplied to the reactor 15 through an inlet 193 in the pressure vessel, on the left-hand side thereof as viewed in FIGURE 2. From the inlet 193, the water enters a generally toroidal plenum chamber 195 which lies between the top of the annular side reflector 25 and the lower flange 119 of the flow divider. From the plenum chamber 195, water flows generally downward between the reflector 25 and the inner surface of the thermal shield 33 into the region below the core support plate 79. From this region, the water passes upward through the perforated support plate 79 and the bottom grid plate 83 and thence upward through the reactor core in the passageways between the vertically extending fuel elements 23 wherein it becomes a mixture of steam and water. This annular region of the reactor core 21 which lies between the honeycomb structure 121 and the flow-divider 27 and in which the fuel elements 23 are disposed is sometimes hereinafter referred to as the active core region.

The illustrated reactor 15 is operated under boiling and forced circulation conditions, although natural convection might be utilized with suitable adjustment of the coolant flow paths. Preferably, the boiling boundary is established about one-third of the way up from the bottom of the core (as shown by the line B—B, FIG. 2) by appropriately regulating the reactor conditions. Under such circumstances, by the time the fluid coolant reaches the top of the active core, the steam volume fraction of the boiling water is somewhat greater than about 50 percent.

At the top of the core, the boiling water passes through the perforations in the top grid plate 115 into the upper coolant chamber 37 above the core defined by the top grid plate 115, the flow-divider 27 and the bottom surface of the upper portion of the thermal shield 75. From the chamber 37, the boiling water flows downward through the fuel-free region 29 in the plurality of longitudinal channels in the honeycomb structure 121. At the bottom of the fuel-free region 29, the boiling water exits through the opening 69 in the bottom of the thermal shield 33 and flows upward between the outer surface of the thermal shield and the inner surface of the pressure vessel 17 in the generally toroidal exit passageway 35. At the top of the exit passageway 35, the boiling water leaves the reactor through an outlet 197 on the right-hand side of the pressure vessel (FIG. 2).

Figure 4:
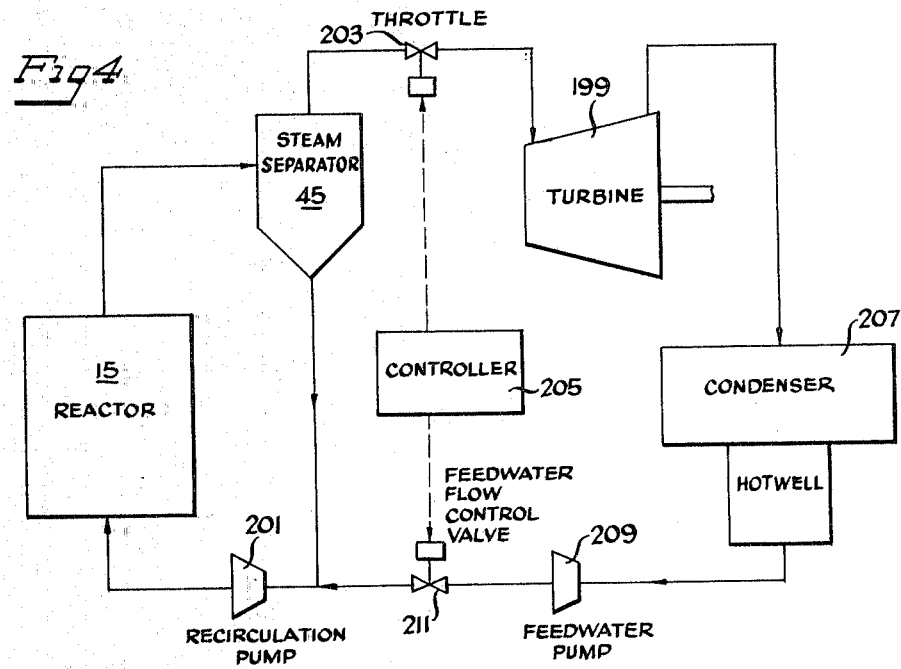
FIGURE 4 is a schematic view illustrating the reactor system shown in FIGURE 1 and various other components thereof.

As shown schematically in FIGURE 4 the steam-water mixture, which leaves the reactor 15 through the outlet 197 passes immediately to a liquid-vapor separator 45 wherein the two phases are separated. The dry, saturated steam passes to a turbine 199, and the liquid is recirculated to the reactor by a recirculation pump 201 connected to the reactor inlet. The flow of steam to the turbine 199 is regulated by a throttle 203 that is actuated by a controller 205. The exhaust from the turbine 199 is conducted to a suitable condenser 207.

The condensate from the condenser 207 is pumped by a feedwater pump into the recirculation line at a point upstream of the recirculation pump 201, thus subcooling the water that enters the recirculation pump. The controller 205 that operates the steam throttle valve 203 is also utilized to operate a feedwater control valve 211 disposed in the line downstream of the feedwater pump 209. The feedwater pump 209 and the recirculation pump 201 may be driven by any suitable means, as by connecting them to the output shaft of the turbine 199. The pumps are driven at suitable speeds to supply water to the reactor 15 at the desired rate and pressure.

The power-conversion system diagrammatically illustrated in FIGURE 4 should be understood to be only exemplary of one suitable type of system that may be employed. The illustrated system is designed for use with a thermodynamic cycle in which saturated steam is produced and supplied to the turbine 199. The nuclear reactor 15 may also be used with other thermodynamic cycles. For example, super-heated steam may be employed by passing the dry steam from the liquid-vapor separator 45 through a suitable superheater pass (not shown) in the pressure vessel 17 before it enters the turbine 199. Also, steam in the supercritical range may also be generated by the reactor 15.

To by-pass the fuel-free region 29 in the event of coolant flow cessation, as when power operation is discontinued, direct fluid communication is provided between the upper chamber 37 and the upper end of the toroidal exit passageway 35 through an aperture 213 in the upper flange 119 of the flow divider and an adjacent opening 215 in the upper portion of the thermal shield 33. The aperture 213 in the upper flange is closed by a pressure-responsive valve 217 which is biased to the normally open position. The valve 217 is closed during normal power operation of the reactor 15 because the pressure in the upper chamber 37 sufficiently exceeds that at the reactor outlet 197. When, as during reactor shutdown, coolant flow drops to such a relatively low level that the pressure differential is no longer sufficient to overcome the force of the valve spring, the valve 217 automatically opens. Opening of the valve 217 provides a path for the coolant from the active region of the reactor core directly to the outlet 197 without passing through the fuel-free region 29 and thus facilitates heat extraction from the reactor core.

The inherent load-following capability of the reactor 15 is, in part, accomplished by providing nuclear fuel material having a negative temperature coefficient of reactivity. In the illustrated embodiment, each of the fuel elements 23 contains a solid, homogeneous mixture of zirconium hydride and highly enriched uranium (i.e., greater than 90 percent uranium 235).

The zirconium hydride composition is selected so that the fuel elements 23 can easily withstand the relatively high temperatures which may be encountered in such a power reactor. A higher hydride composition, i.e., wherein the ratio of hydrogen atoms to zirconium atoms is greater than about 1.5 to 1, is accordingly selected because such a composition is single phase (gamma) and is therefore not subject to phase separation as a result of thermal cycling. The absence of a second phase in the higher hydride composition eliminates the possible problem of the large volume changes associated with phase transformations, normally occurring at approximately 530° C. in lower hydride compositions. Preferably, a zirconium hydride composition wherein the ratio of hydrogen atoms to zirconium atoms is about 1.6 to 1 is employed.

Fuel elements 23a, which constitute the majority of the fuel elements in the reactor core 21, preferably employ a solid, homogeneous mixture of U-ZrH$_{1.6}$ in which the uranium constitutes about 8 percent, by weight, of the total mixture. Fuel elements 23b and 23c, which are employed along the outer and inner peripheries of the core, preferably employ a solid, homogeneous mixture of U-ZrH$_{1.6}$ in which uranium is present in an amount of about 4 percent by weight of the total mixture.

Each of the fuel elements 23 also preferably contains a suitable burnable poison such as erbium 167, lutecium 176, or a mixture of these elements. Most preferably, erbium 167 is employed. Erbium serves as a burnable poison and also contributes significantly to the total prompt negative temperature coefficient of reactivity of the nuclear fuel material.

As a burnable poison, erbium reduces the net amount of excess reactivity initially available in the reactor at the beginning of fuel element life. Because the value of the neutron capture cross section of erbium rises sharply relative to neutrons having an energy level above about 0.47 e.v., erbium 167 contributes to the negative temperature coefficient of reactivity of the nuclear fuel. The fission cross section of uranium 235, on the other hand, is generally inversely proportional to the velocity of the neutrons. As the temperature of the fuel element 23 increases, the energy level of the neutrons increases because of the "warm neutron effect" as previously explained. Thus, the proportion of neutrons captured by the erbium 167 relative to the neutrons which cause fission in the uranium 235 increases with temperature, resulting in a consequent decrease in reactivity.

The erbium may be homogeneously distributed throughout the nuclear fuel material 89 or may be disposed in a fuel element 23 in lumped form. In the illustrated embodiment, the fuel elements 23a include erbium homogeneously alloyed with the U-ZrH mixture. Erbium is preferably employed in an atom to atom ratio of between about 0.03 to about 0.05 atoms of erbium per each atom of uranium 235.

Fuel elements 23b and 23c, which are employed along the inner and outer peripheries of the annular core, employ lumped erbium. As best seen in FIGURES 7 and 8, the lumped erbium is in the form of a wire 219 which is incorporated in the fuel elements by drilling an axial hole through the solid U-ZrH mixture. The erbium wire 219 is then placed in the hole, and the fuel mixture 89 clad in the stainless steel tube 85 and hydrided. Hydriding causes expansion of the nuclear fuel material 89 with a resultant close fit against the tube 85 and also against the erbium wire 219.

As the lumped erbium burns out, the temperature coefficient is influenced by two competing factors. Loss of erbium tends to decrease the prompt, negative, temperature coefficient provided by the erbium. However, as the erbium becomes less self-shielded, its effectiveness per unit mass increases, off-setting to some degree the decrease caused by burn-up.

The inherent load-following capability of the reactor 15 is provided by designing the reactor core 21 so that the fluid coolant-moderator in the active region of the reactor core has a predetermined positive density coefficient of reactivity and so that the fluid coolant-moderator in the fuel-free region 29 of the core has a predetermined negative density coefficient of reactivity.

The design is such that when load on the system is changed, the net reactivity increment produced by changes in fluid density in the active core and fuel-free region balances the reactivity increment resulting from the concurrent change in temperature of the fuel-moderator mixture. This relation is expressed in the following equation:

$$K_f \delta T_f + D_c \frac{\delta \bar{\rho}_c}{\bar{\rho}_c} + D_a \frac{\delta \bar{\rho}_a}{\bar{\rho}_a} = 0 \quad \text{(Equation 1)}$$

where $K_f$ = temperature coefficient of reactivity of the fuel-moderator mixture, $D_c$ = density coefficient of reactivity of the water-steam mixture in the active core region, $D_a$ = density coefficient of reactivity of the water-steam mixture in the fuel-free region, $\delta T_f$ = change in the average temperature of the fuel-moderator mixture, $\delta \bar{\rho}_c / \bar{\rho}_c$ = fractional change in average density of the water-steam mixture in the active core region, $\delta \bar{\rho}_a / \bar{\rho}_a$ = fractional change in density of the water-steam mixture in the fuel-free region.

The predetermined positive density coefficient of reactivity of the fluid coolant-moderator in the active region of the reactor core is regulated by controlling the sizes of the passageways between the fuel elements. As previously stated, the elongated, tubular fuel elements 23 are spaced predetermined distances apart by the spiral ribs 87 thereon, so that each of the fuel elements is surrounded by a flowing stream of coolant-moderator. By controlling the spacing of the fuel elements 23, regulation of the ratio of the volume of the coolant-moderator in the active core region to the volume of the nuclear fuel mixture 89 in the active core region is closely controlled. Close control of this ratio allows a reactor to be designed wherein the coolant-moderator in the active core region has a positive density coefficient of reactivity within the desired range.

There are a number of factors which contribute to the total effect which the coolant-moderator in the active core portion has upon the reactivity of the reactor. Some of these factors include the effects hereinbefore previously described, i.e., the "warm neutron" effect, and the "leakage" effect.

In addition to these factors, in the illustrated nuclear reactor 15, there is an additional factor which plays a major part in the reactivity effect of the coolant-moderator in the active core portion. Because the reactor operates under boiling conditions, steam bubbles or voids are produced in the coolant stream. The density of these bubbles is of course considerably less than the density of the surrounding water. Accordingly, the moderating effect provided by the steam is substantially less than that previously provided by the water, and the consequent moderating properties of the fluid are substantially decreased. The net effect results in a rise in the average energy level of the neutrons in the reactor core and a consequent increase in leakage or escape of neutrons from the core.

When the reactor 15 is operating under power-generating conditions, the active core region and the fuel-free region 29 are in series flow relationship so that the coolant-moderator passes through the fuel-free region after flowing from the active portion of the reactor core 21. In general, when a neutron reaches the relatively large fuel-free region, the primary concern becomes whether or not the neutron will return to the fuel-containing region of the core where it may cause another fission. In this respect, the water in the fuel-free region functions as a poison, providing a barrier through which the neutron must pass before it again encounters a fueled region. The capture potential of the water in the fuel-free region 29 is thus important. As the steam fraction increases, the potential for neutron capture accordingly decreases, resulting in a decrease in the total capture potential of the coolant-moderator in the fuel-free region 29 and a corresponding positive contribution to the reactivity of the reactor 15.

In the illustrated reactor 15, the fuel-free region 29 is in the form of the central hole which is provided by the honeycomb structure 121. Although this is the preferable form of the fuel-free region, it should be understood that fuel-free regions of different shapes may be used to achieve the desired result. For example, a fuel-free annulus may be provided within an otherwise cylindrical reactor core, in which case the active core region would be divided into two separate sections by the fuel-free region. Other suitable shapes for the fuel-free region 29 may also be used.

The location, the shape, and the size of the fuel-free region 29 determine the magnitude of the density coefficient of reactivity of the fluid therewithin. The geometrical criterion which must be satisfied in order that the fuel-free region produce the desired effect is that it be large enough for the density coefficient of reactivity of the fluid associated therewith to be first, opposite in polarity to the density coefficient of reactivity associated with the remaining fluid passages through the core, and second, of a comparable magnitude with this latter coefficient. In addition, the size and location of the fuel-free region should be such that the reactivity change produced by the changes in fluid temperature and density from shutdown conditions to power operating conditions is approximately equal, and of opposite sign, to the reactivity changes due to the changes in core coolant temperature and density and due to the increase in fuel element temperature from shutdown to operating conditions. The balancing of these reactivity changes contributes to the minimization of the excess reactivity in the reactor. In the particular embodiment of the invention hereinafter described, a central hole of 6 inches diameter within a 15 inch diameter core satisfies these criteria. Other specific core configurations or sizes would require different values for the hole diameter in order to be satisfactory. The design of the fuel-free region 29 is of course dependent upon many considerations, including the particular fluid to be used.

Because there are so many variables in the complex apparatus of a nuclear reactor which influence its reactivity characteristics, no simple expression of the actual physical dimensions of the fuel-free region 29 can be given. The various influencing factors include, but are by no means limited to the particular coolant-moderator used, the inlet and outlet temperatures of the coolant, the operating pressure of the reactor, the particular thermodynamic cycle chosen, the rate of flow of the coolant, the estimated operating temperatures of the reactor, and the type of nuclear fuel material employed. However, when some of these parameters are decided for a desired nuclear reactor system, particular structural characteristics can be computed through the use of formulae well known to those skilled in the art to allow the determination of precise reactor core dimensions which will provide the desired density coefficients of reactivity for the fluid within the active core region and the fuel-free region.

Depending, in general, upon the relative magnitudes of the density coefficients of reactivity of the fluids within these two regions, the resultant change in the fuel temperature will be positive or negative in response to a particular change in load. A given decrease in load on the reactor 15 is reflected as a change in reactor operating conditions resulting in an increase in the pressure within the reactor and an increase in fluid density. If, in such a situation, the design is such that the increase in reactivity resulting from the density change of the fluid in the active core region outweighs the decrease in reactivity contributed by the density change of the fluid in the fuel-free region 29, then the fuel temperature should increase to thereby contribute sufficient negative reactivity to balance the difference. This instance is expressed by rewriting Equation No. 1 as follows:

$$D_c \frac{\delta \bar{\rho}_c}{\bar{\rho}_c} + D_a \frac{\delta \bar{\rho}_a}{\bar{\rho}_a} = -K_f \delta T_f \quad \text{(Equation 2)}$$

The steam volume fraction increases progressively, from zero as it enters to its exit value, as the water passes through the active core region. However, thereafter, it remains essentially constant as the water passes through the fuel-free region 29 because relatively little heat is added to the coolant-moderator stream here. Accordingly, the average fluid density for a given steady-state condition is always less in the fuel-free region 29 than in the active core region. Consequently, changes in density of the fluid in the fuel-free region $(\delta \bar{\rho}_a / \bar{\rho}_a)$ are greater for a given load change than the corresponding changes in fluid density the active core region $(\delta \bar{\rho}_c / \bar{\rho}_c)$. For this reason, the load-induced changes is reactivity contributed by the fluid within the fuel-free region 29 may well predominate over the corresponding reactivity changes contributed by the fluid within the active core region, even though the magnitude of the coefficient of reactivity of the active core region $(D_c)$ may exceed the coefficient of reactivity of the fluid-free region $(D_a)$ over most of the range of fluid densities.

In any respect, a new equilibrium state is automatically achieved within the reactor 15 in which the excess reactivity is zero without any external insertion or withdrawal of reactivity. If as a result of a particularly large change in the load the fuel temperature change is considered excessive, rotation of the control drums 135 may be used to appropriately adjust the reactivity of the reactor 15 to return the temperature of the fuel to within the desired range.

Of course, the density coefficients of reactivity associated with a particular nuclear reactor system may likely not be constant over the entire range of coolant-moderator densities. The operating conditions of the reactor 15, including the fluid density of coolant-moderator, vary significantly between the times when the reactor is operating near zero load and when it is operating near the maximum load for which it is designed. Thus, it should be understood that it is possible that the resultant temperature and pressure variations of the nuclear reactor system may be positive over part of the load range and negative over the remainder of the range. For example, a decrease in load from about 90 percent to about 80 percent of load may result in a small increase in fuel temperature, whereas a decrease in load from 30 percent to 20 percent of load may result in a small decrease in fuel temperature. However, in both instances, equilibrium conditions will be automatically and promptly established.

In one embodiment of a reactor 15 having the characteristics illustrated in the drawings, the parameters set forth in the following table are employed:

TABLE I

| | |
|---|---|
| Reactor thermal power (6.1 Mw.(t)) | $2.08 \times 10^7$ B.t.u./hr. |
| Steam generation rate | 19,900 lb./hr. |
| Coolant flow rate | 318,000 lb./hr. |
| Coolant inlet conditions: | |
|   Pressure | 765 p.s.i.a. |
|   Temperature | 491° F. |
|   Subcooling | 22° F. |
| Coolant outlet conditions: | |
|   Pressure | 750 p.s.i.a. |
|   Temperature | 511° F. |
|   Quality | 0.0625. |
| Channel hydraulic diameter | 0.125 in. |
| Heat transfer area | 120 ft.$^2$. |
| Coolant average mass velocity in core | $1.5 \times 10^6$ lb./hr.-ft.$^2$. |
| Heat flux: | |
|   Average | 177,000 B.t.u./hr.-ft.$^2$. |
|   Maximum | 354,000 B.t.u./hr.-ft.$^2$. |
| DNB (burnout) ratio | 3.2. |
| U-ZrH fuel temperatures: | |
|   Volumetric average | 605° F. |
|   Maximum | 845° F. |
| Active core configuration: | |
|   Outsider diameter | 15.0 in. |
|   Inside diameter | 6.0 in. |
|   Length of fuel in fuel element | 18.0 in. |
|   Volume | 1.54 ft.$^3$. 43.5 liters. |
| Active core configuration: | |
|   Fuel element diameter | 0.5 in. |
|   Center-to-center fuel element spacing | 0.532 in. |
|   Volume fraction of active core region: | |
|     U-ZrH$_{1.6}$ | 0.74. |
|     Cladding | 0.06. |
|     Coolant | 0.20. |
| Active core composition: | |
|   Weight fraction uranium in U-ZrH$_{1.6}$ | 8% max. |
|   Uranium inventor, fully enriched | 14.7 kg. |
|   Zirconium inventory | 170.0 kg. |
|   Atom ratio: erbium 167/U$^{235}$ | 0.03 to 0.05. |
|   Atom ratio: hydrogen/U$^{235}$ | 60. |
|   Average coolant water density | 0.56 gm/cm.$^3$. |

| | Rated Power | Cold |
|---|---|---|
| Power distribution: | | |
|   Cell power density peak local/avg | 1.05 | 1.09 |
|   Core radial power density peak local/avg | 1.5 | 1.8 |
|   Core axial power density peak local/avg | 1.3 | 1.3 |

TABLE I—Continued

Reactivity:
  Cold clean excess reactivity _____ 4.0% δk/k.
  Reflector control worth ____ 6.0% δk/k.
Burnup:
  Energy removed _____ 2800 Mw.-days.
  Equivalent full-power hours at 6.1 mw.(t.) _____ 11,000 hours.
  $U^{235}$ consumed _____ 3.9 kg.
  Peak fraction metal atoms fissioned _____ 1%.

Reactivity coefficients at about rated power:

Nuclear fuel-temperature _____ $-1.2 \times 10^{-4} \delta k/k^\circ$ C.

Core water-density _____ $+0.08 \frac{1}{k} \frac{\delta k}{\delta \rho} \frac{cm.^3}{gm.}$ Center hole water-density ____ $-0.02 \frac{1}{k} \frac{\delta k}{\delta \rho} \frac{cm.^3}{gm.}$ The nuclear reactor 15 incorporating the above parameters will automatically respond to changes in the demand for steam flow which result from the action of the controller 205 upon the throttle 203. The reactor 15 responds without the adjustment of any external reactivity controls and without creating any excessive changes in the temperature and pressure levels within the reactor. This highly desirable characteristic results from the overall interaction between the reactivity effects of the coolant-moderator in the active core region and of the coolant-moderator in the central hole, and the reactivity effect of the nuclear fuel.

An illustrative example of the inherent load-following capability of the reactor is afforded by examining the simple situation wherein, while the reactor is operating under full load at steady-state conditions, a decrease in load occurs. This decrease in load is reflected as a decreased steam demand upon the reactor, resulting in a partial closing of the throttle 203. Closing the throttle 203 causes a rise in pressure within the reactor 15. The rise in pressure effects a decrease in the rate of boiling, thereby decreasing the steam void within the active core region. Decreased steam void in the active core region increases the overall coolant-moderator density, contributing a positive increment to the reactivity of the reactor because the coolant-moderator in the active core region has a positive density coefficient of reactivity.

The reduced steam void in the active core region is passed on to the fuel-free region 29 because the central hole is in series fluid connection with the active core region so the steam-water mixture passes through the central hole after leaving the active core region. The reduction in steam void in the fuel-free region 29, which is an increase in density, contributes a negative increment to reactivity because the coolant-moderator in the central hole has a negative density coefficient of reactivity. This negative increment tends to balance the positive increment contributed by the active core fluid.

In addition, the higher pressure and the decreased boiling tend to raise the fuel element temperature. The nuclear fuel mixture, which has a negative temperature coefficient of reactivity, contributes a negative increment of reactivity to the reactor.

The final temperature and pressure level at which the reactivity balance occurs is determined, in general, by the relative magnitudes of the incremental reactivity changes contributed by the changing fluid densities of the coolant-moderator in the active core region and in the fuel-free region. In the reactor having the parameters set forth above, the reactivity effect of the coolant-moderator in the active core region is greater than the reactivity effect of the coolant-moderator in the fuel-free region 29, and the fuel temperature rises by an amount about sufficient to make up the difference in reactivity contributions from the density changes.

The average coolant temperature of course follows the fuel element temperature change, with an appropriate deviation to compensate for the reduced heat transfer from the fuel to the water at decreased load conditions. With a minimum of fluctuations, a new water equilibrium temperature is quickly established. Because the operation of the reactor 15 is under saturation conditions, a new system pressure is likewise established.

For a subsequent increase in load upon the reactor from a level of operation at which it is at less than full load, an opposite sequence of events occurs. A steady-state equilibrium condition is likewise quickly established.

To test the stability of the reactor 15 and its quickness of response, the reactor is operated at about 100 percent of maximum load and the throttle suddenly is closed in a one second interval to decrease the load until it is operating at 50 percent of maximum load. No external adjustment of reactivity is made. The nuclear reactor system responds quickly to this 50 percent decrease in load and automatically achieves a new steady-state condition with balanced steam production and steam demand in less than about 2 minutes. After equilibrium conditions are established at this load, an increase in steam demand is effected by returning the throttle to the 100 percent of full-load position in one second. A similar stable return of the nuclear reactor system to full-load steady-state conditions is observed within less than about 2 minutes.

While the invention has been described primarily with regard to one specific embodiment of a nuclear reactor, it should be understood that this description is intended to be merely illustrative of the invention and not to constitute limitations upon its scope, which is defined in the accompanying claims. Modifications and equivalents that will be apparent to those skilled in the art are contemplated as being within the scope of the invention. For instance, although the reactor 15 is described with respect to the use of ordinary water as the coolant-moderator, other suitable fluids may also be used, such as heavy water or organic liquids which will remain stable at operating conditions and which can be boiled at suitable temperatures. Likewise, the overall size of the reactor may be changed to provide a reactor capable of operating at other desired power levels.

Various of the features of the invention are set forth in the following claims.

What is claimed is:

1. A nuclear power reactor comprising a reactor core which includes an active region containing nuclear fuel material and having passageways formed therein which extend therethrough, said reactor core having formed therein a fuel-free region, means connecting said fuel-free region in series fluid communication with said passageways, and means for circulating a fluid that is both a coolant and a moderator through said passageways and then through said fuel-free region, said nuclear fuel material having a negative temperature coefficient of reactivity, the fluid in said passageways having a predetermined positive density coefficient of reactivity, and the fluid in said fuel-free region having a predetermined negative density coefficient of reactivity, said predetermined density coefficients of the fluid being so selected that in response to a change in operating conditions the difference of their reactivity contributions is balanced by the reactivity contribution resulting from the negative temperature coefficient of the nuclear fuel material, whereby a variation in the power load upon the reactor is automatically compensated for within the reactor without requiring any external adjustment of reactor reactivity and without causing an undesirable amount of change in fuel temperature.

2. A forced-circulation boiling nuclear power reactor comprising a reactor core which includes an active region containing nuclear fuel material and having passageways formed therein which extend therethrough, said reactor core having formed therein a fuel-free region, means connecting said fuel-free region in series fluid communication with said passageways, and means circulating a fluid that is both a coolant and a moderator through said passageways and then through said fuel-free region at a rate and at a pressure so that boiling occurs in said passageways, said nuclear fuel material having a negative temperature coefficient of reactivity, the fluid in said passageways having a predetermined positive density coefficient of reactivity, and the fluid in said fuel-free region having a predetermined negative density coefficient of reactivity, said predetermined density coefficients of the fluid being so selected that in response to a change in operating conditions the difference of their reactivity contributions is balanced by the reactivity contribution resulting from the negative temperature coefficient of the nuclear fuel material, whereby a variation in the power load upon the reactor is automatically compensated for within the reactor without requiring any external adjustment of reactor reactivity and without causing an undesirable amount of change in fuel temperature.

3. A forced-circulation boiling nuclear power reactor comprising a reactor core which includes an active region containing a plurality of elongated fuel elements that contain nuclear fuel material, means spacing said fuel elements apart from one another to provide passageways which extend through said reactor core, said reactor core also having formed therein a fuel-free region, means connecting said fuel-free region in series fluid communication with said passageways, and means circulating a fluid that is both a coolant and a moderator through said passageways and then through said fuel-free region at a rate and at a pressure so that boiling occurs in said passageways, said nuclear fuel material having a negative temperature coefficient of reactivity, said core and said fuel elements being so dimensioned that the fluid in said passageways has a predetermined positive density coefficient of reactivity, and said fuel-free region being so dimensioned and so located that the fluid in said fuel-free region has a predetermined negative density coefficient of reactivity, said predetermined density coefficients of the fluid being so selected that, in response to a change in operating conditions, the difference of their reactivity contributions is balanced by the reactivity contribution resulting from the negative temperature coefficient of the nuclear fuel material, whereby a variation in the power load upon the reactor is automatically compensated for within the reactor without requiring any external adjustment of reactor reactivity and without causing an undesirable amount of change in fuel temperature.

4. A boiling nuclear power reactor operating under load conditions which reactor comprises a reactor core which includes an active region containing a plurality of elongated fuel elements that contain nuclear fuel material, control means in association with said core for regulating the reactivity of said core, means spacing said fuel elements apart from one another to provide passageways therebetween which extend through said reactor core, said reactor core also having formed therein a fuel-free region, means connecting said fuel-free region in series fluid communication with said passageways, and means for circulating a fluid that is both a coolant and a moderator through said passageways and then through said fuel-free region with boiling of the fluid occurring in said passageways, said nuclear fuel material having a negative temperature coefficient of reactivity, said core and said fuel elements being so dimensioned that the fluid in said passageways has a predetermined positive density coefficient of reactivity, and said fuel-free region being so dimensioned and located that the fluid in said fuel-free region has a predetermined negative density coefficient of reactivity, said predetermined density coefficients of the fluid being so selected that, in response to a change in operating load conditions, the difference of their reactivity contributions is balanced by the reactivity contribution resulting from the negative temperature coefficient of the nuclear fuel material, whereby a variation in the power load upon the reactor is automatically compensated for within the reactor without requiring any external adjustment of said control means and without causing an undesirable amount of change in fuel temperature.

5. The boiling nuclear power reactor as defined in claim 4 in which said fuel-free region is a central hole.

6. The boiling nuclear power reactor as defined in claim 4 in which said fuel-free region is a centrally disposed annulus.

7. A forced-circulation boiling water nuclear power reactor comprising a reactor core which includes an active region having a plurality of fuel elements each of which contains a solid homogeneous mixture of nuclear fuel material and zirconium hydride, said fuel elements being spaced apart to provide a plurality of fluid passageways therebetween, means defining a fuel-free region in said reactor core, means connecting the inlet of said fluid-free region in series fluid communication with the outlets of said passageways, control means operable externally of said reactor disposed in association with said core for regulating the reactivity of said core, and means for circulating water first through said passageways and then through said fuel-free region at a rate and pressure so that boiling occurs within said passageways, said homogeneous fuel mixture having a prompt negative temperature coefficient of reactivity, the water-steam mixture in said passageways having a predetermined positive density coefficient of reactivity, and the water-steam mixture in said fuel-free region having a predetermined negative density coefficient of reactivity, said predetermined density coefficients of reactivity being so selected that in response to a change in steam demand upon the reactor the difference of the respective reactivity contributions is balanced by the reactivity contribution resulting from the negative temperature coefficient of said homogeneous mixture whereby a variation in the power load upon the reactor is automatically compensated for within the reactor without requiring any external adjustment of said control means and without causing an undesirable excessive change in the temperature of said homogeneous mixture.

8. A forced-circulation boiling water nuclear power reactor comprising a pressure vessel, a generally cylindrical reactor core disposed within said pressure vessel which includes an annular active region having a plurality of tubular fuel elements each of which contains a homogeneous mixture of highly enriched uranium and zirconium hydride, said fuel elements being spaced apart to provide a plurality of fluid passageways therebetween, an elongated honeycomb structure located concentrically within said reactor core which defines a fuel-free region therewithin, means connecting the inlet end of said honeycomb structure in series fluid communication with the outlet ends of said passageways, control means operable externally of said pressure vessel for regulating the reactivity of said core, and means for circulating water first through said passageways and then through said fuel-free region at a controlled rate and pressure so that boiling occurs about one-third of the distance from the inlet ends of said passageways, said homogeneous fuel mixture having a prompt negative temperature coefficient of reactivity, said core and said fuel elements being so dimensioned that the water-steam mixture in said passageways has a predetermined positive density coefficient of reactivity, and said honeycomb structure being so dimensioned that the water-steam mixture in said fuel-free region has a predetermined negative density coefficient of reactivity, said predetermined density coefficients of reactivity being so selected that in response to a change in steam demand upon the reactor the difference of the respective reactivity contributions of the water-steam mixtures is balanced by the reactivity contribution resulting from the negative temperature coefficient of said homogeneous mixture whereby a variation in the power load upon the reactor is automatically compensated for within the reactor without requiring any external adjustment of said control means and without causing an undesirable excessive change in the temperature of said homogeneous mixture.

9. A forced-circulation boiling water nuclear reactor producing steam for useful power generation which reactor comprises a pressure vessel, a generally cylindrical reactor core disposed within said pressure vessel which includes an annular active region having a plurality of vertically disposed tubular fuel elements each of which contains a homogeneous mixture of highly enriched uranium and $ZrH_{1.6}$, said fuel elements being laterally spaced apart to provide a plurality of fluid passageways therebetween, an elongated vertically disposed honeycomb structure located concentrically within said reactor core and defining a fuel-free region therewithin, means connecting the upper end of said honeycomb structure in series fluid communication with the upper ends of said passageways, control means operable externally of said pressure vessel disposed in association with said core for regulating the reactivity thereof, and means for circulating water first upward through said passageways and then downward through said fuel-free region at a controlled rate and pressure so that boiling occurs about one-third of the distance upward from the inlet ends of said passageways, said homogeneous fuel-moderator mixture having a prompt negative temperature coefficient of reactivity, said core and said fuel elements being dimensioned so that the water-steam mixture in said passageways has a predetermined positive density coefficient of reactivity, and said honeycomb structure being dimensioned so that the water-steam mixture in said fuel-free region has a predetermined negative density coefficient of reactivity, said predetermined density coefficients of reactivity being so selected that, in response to a change in the steam demand upon the reactor, the difference of the respective reactivity contributions is balanced by the reactivity contribution resulting from the negative temperature coefficient of said homogeneous fuel mixture.

References Cited by the Examiner
UNITED STATES PATENTS

| | | | |
|---|---|---|---|
| 2,998,367 | 8/1961 | Untermyer | 176—54 |
| 3,072,549 | 1/1963 | Koutz et al. | 176—62 |
| 3,127,325 | 3/1964 | Taylor et al. | 176—62 |
| 3,164,525 | 1/1965 | Wetch et al. | 176—55 |
| 3,167,480 | 1/1965 | West et al. | 176—56 |
| 3,180,802 | 4/1965 | West et al. | 176—54 |
| 3,257,285 | 6/1966 | Clifford et al. | 176—94 X |

L. DEWAYNE RUTLEDGE, *Primary Examiner.*